US012179824B2

(12) United States Patent
Grönholm et al.

(10) Patent No.: US 12,179,824 B2
(45) Date of Patent: Dec. 31, 2024

(54) DOLLY

(71) Applicant: K. Hartwall Oy Ab, Söderkulla (FI)

(72) Inventors: Jack Grönholm, Söderkulla (FI);
Johan Lindström, Söderkulla (FI);
Thomas Oriander, Söderkulla (FI);
Jussi Raninen, Söderkulla (FI)

(73) Assignee: K. Hartwall Oy Ab, Söderkulla (FI)

( * ) Notice: Subject to any disclaimer, the term of this patent is extended or adjusted under 35 U.S.C. 154(b) by 288 days.

(21) Appl. No.: 17/699,231

(22) Filed: Mar. 21, 2022

(65) Prior Publication Data

US 2022/0306178 A1   Sep. 29, 2022

(30) Foreign Application Priority Data

Mar. 24, 2021   (FI) ..................................... 20215334

(51) Int. Cl.
*B62B 5/04*    (2006.01)
*B60T 11/04*   (2006.01)
*B62B 3/00*    (2006.01)

(52) U.S. Cl.
CPC .......... *B62B 5/0447* (2013.01); *B60T 11/046* (2013.01); *B62B 3/001* (2013.01)

(58) Field of Classification Search
CPC ...... B62B 5/0447; B62B 3/001; B60T 11/046
USPC ...... 188/2 D, 19, 21, 22; 280/33.994, 43.12, 280/43.17
See application file for complete search history.

(56) References Cited

U.S. PATENT DOCUMENTS

| | | | |
|---|---|---|---|
| 2,169,781 A * | 8/1939 | Abresch | F16D 49/16 188/169 |
| 4,986,596 A | 1/1991 | Gohier | |
| 5,199,729 A | 4/1993 | Sievert et al. | |
| 2002/0154982 A1 | 10/2002 | Schedler et al. | |
| 2002/0175496 A1 | 11/2002 | Novakowski | |
| 2021/0009023 A1 | 1/2021 | Hoeper et al. | |

FOREIGN PATENT DOCUMENTS

| | | | | |
|---|---|---|---|---|
| CH | 679929 A5 * | 5/1992 | ............... | B62B 5/04 |
| DE | 102013215689 A1 | 2/2015 | | |
| GB | 2260116 A | 4/1993 | | |
| JP | H09207784 A | 8/1997 | | |
| WO | WO03057542 A2 | 7/2003 | | |
| WO | WO2004096617 A2 | 11/2004 | | |
| WO | WO2020033300 A1 | 2/2020 | | |

OTHER PUBLICATIONS

Office Action in Finnish Patent Application No. FI 20215334, dated Aug. 29, 2024.

* cited by examiner

*Primary Examiner* — Christopher P Schwartz
(74) *Attorney, Agent, or Firm* — Chernoff, Vilhauer, McClung & Stenzel, LLP

(57) ABSTRACT

According to a first aspect of the present disclosure, there is provided a dolly featuring at least one wheel, an auto-engaging brake, and a release mechanism for selectively manipulating the auto-engaging brake from an applied state to a released state. The dolly further includes a tow bar which is connected to the release mechanism for operating the auto-engaging brake between the applied and released state.

19 Claims, 4 Drawing Sheets

DOLLY

FIELD

The present disclosure relates to logistics equipment, in particular to wheeled load carriers. More specifically, the disclosure relates to a dolly with a braking mechanism.

BACKGROUND

Dollies for distributing products from one location to another are common in warehouses and other commercial facilities. A dolly is also referred to as a "platform truck", "platform cart", "push dolly", "push cart", or "push cart dolly". Dollies may have braking mechanisms to allow for convenient user control while transporting.

Some varieties of dollies are towed by a driving vehicle where multiple dollies can be hitched together at the front and back ends. These dollies capable of being hitched and towed, are often unhitched from one another for several reasons, such as less cargo required in the group of towed dollies and maintenance. When these dollies do not require towing they are unhitched and consequently able to move freely if pushed. The ability for the dolly to move once unhitched can cause the dolly to solely move on a sloped surface or be moved when bumped into. In other words, these dollies can lead to unsafe working environments since they can cause injury and also damage surrounding items. Additionally, if dollies are unexpectedly moved, there is a risk that the loaded item can be damaged by a sudden crash or by falling.

Braking mechanisms have been developed to address this issue. Conventional braking mechanism are operated with foot levers for selectively applying and releasing the brake.

However, there is a need to improve the usability of the braking mechanisms of towable dollies.

SUMMARY

A novel dolly is therefore herein proposed. The dolly features a tow bar that automatically releases a braking mechanism when the dolly is unhitched, i.e. when the dolly is not towed. The dolly is defined by the hereto appended independent claim.

According to a first aspect of the present disclosure, there is provided a dolly featuring at least one wheel, an auto-engaging brake, and a release mechanism for selectively manipulating the auto-engaging brake from an applied state to a released state. The dolly further includes a tow bar which is connected to the release mechanism for operating the auto-engaging brake between the applied and released state.

One or more embodiments may include one or several features from the following itemized list:

- the tow bar is pivotably provided to the dolly to be turned between a generally vertical storage orientation and a generally horizontal towing orientation;
- the auto-engaging brake is configured to default into the braking state;
- the tow bar is connected to the release mechanism such that the release mechanism manipulates the auto-engaging brake to the released state, when the tow bar is in the towing orientation;
- the tow bar is connected to the release mechanism such that the release mechanism allows the auto-engaging brake to return to the applied state, when the tow bar is in the storage orientation;
- the dolly comprises biasing means configured to urge the tow bar towards the storage orientation;
- the dolly comprises a handle which is connected to the release mechanism to be toggled between an inactive state, in which the handle does not impact the release mechanism, and an active state, in which the handle impacts the release mechanism so as to manipulate the auto-engaging brake to the released state;
- the auto-engaging brake comprises an external impactor;
- the external impactor is configured to selectively operate the brake between the applied and released state upon manipulation of the impactor;
- the release mechanism comprises a transmission line connecting the two bar to the impactor;
- the release mechanism is configured to transmit and convert rotation movement of the tow bar into manipulation of the impactor;
- the tow bar is connected to the dolly through an axle which is configured to transmit rotational movement of the axle as translation of the transmission line;
- the dolly comprises a plurality of wheels and auto-engaging brakes associated with the plurality of wheels;
- the release mechanism comprises a respective plurality of branches for the wheels auto-engaging brakes;
- the release mechanism comprises a second transmission line connecting the handle to the impactor;
- the dolly comprises a frame;
- the tow bar comprises a first hitch counterpart;
- the dolly comprises a second hitch counterpart provided at an end of the frame opposing the tow bar;
- the counterparts are configured to selectively engage each other for connecting several such dollies in series;
- the counterparts are configured to allow for rotation between the tow bar of one such dolly and the frame of another such dolly about a vertical rotation axis,
- the first counterpart is female, the second counterpart is male Considerable benefits are gained with the aid of the novel dolly. The auto-engaging brake ensures that the dolly is stationary when not in use or not towed. On the other hand, the brake is automatically released, when the tow bar is lowered into towing configuration. This process is achieved without the user conducting an extra step to manipulate the brake into an applied state. In other words, when the user detaches, or unhitches, the tow bar from a hitch counterpart of another dolly, there is no extra step to apply the brake. The tow bar, therefore, ensures that the dolly does not unexpectedly move on a surface, particularly a sloped surface. Achieving a stationary dolly ensures safety in the environment surrounding the dolly. Workers who handle the dollies are not susceptible to an injury caused by a dolly unexpectedly moving on a sloped surface. Additionally, the dolly is likely not to damage surrounding items due to a sloped surface, therefore, repairs and costs can be avoided.

According to some embodiments the tow bar may automatically retreat to a storing configuration immediately after detachment, and the brake is automatically applied.

BRIEF DESCRIPTION OF THE DRAWINGS

In the following certain exemplary embodiments are described in detail with reference to the accompanying drawings, in which.

EMBODIMENTS

In the present context, a dolly refers to a vehicle suitable for transporting goods. Such dollies may be linked to one another to create a train of dollies for transporting a larger number of goods. On a general level, the proposed construction is based on the idea of providing a means to automatically apply a brake immediately after a dolly is no longer hitched.

Figure 1:
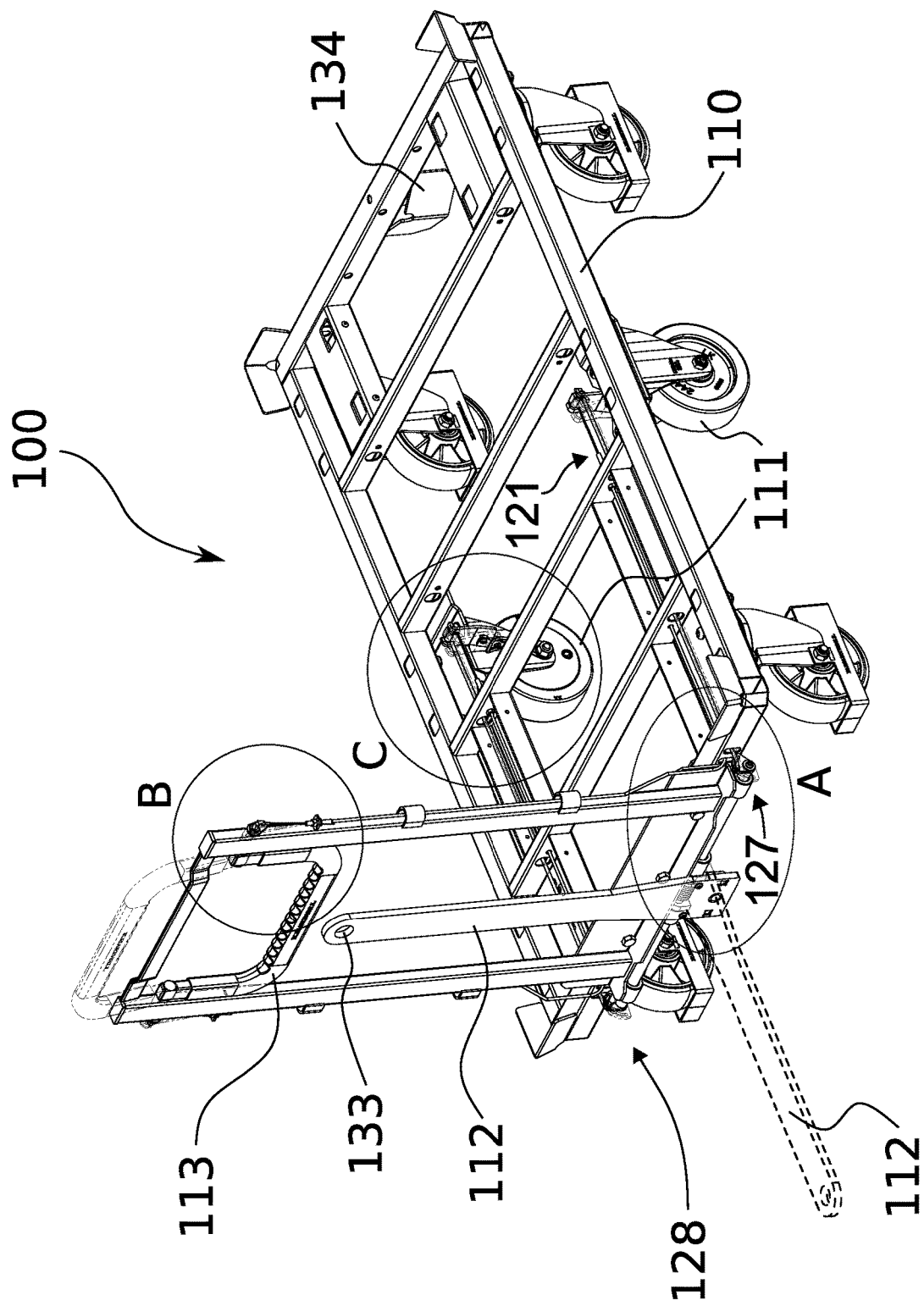
FIG. 1 illustrates a perspective view of a dolly device in accordance with at least some embodiments.

FIG. 1 illustrates a general view of a dolly 100 according to an exemplary embodiment. The dolly has a frame 110 having a front side, a back side, a right side, a left side, and an upper section. According to this exemplary embodiment, the frame 110 is made of welded steel. The dolly 100 has a tow bar 112 which has a first end pivotally connected to the front side of the frame 110. FIG. 1 illustrates two orientations of the tow bar 112, namely a generally vertical storage orientation and a generally horizontal or non-vertical towing orientation. The storage orientation is illustrated in solid lines, while the towing orientation is illustrated in dashed lines. The tow bar 112 has a second end opposing the first end, where the second end comprises of a first hitch counterpart 133. The first hitch counterpart 133 is configured to connect to a second hitch counterpart 134 of another dolly. The first hitch counterpart 133 is shown as a female, and the second hitch counterpart 134 is shown as a male. The counterparts 133, 134 are designed to allow for rotation about a vertical rotation axis.

The dolly has at least one wheel 111. In the illustrated exemplary embodiment, the frame has six wheels, two wheels which are fixed and do not swivel, and four wheels which swivel.

According to the illustrated embodiment, the dolly 100 has a handle 113 connected to an upright section extending from the frame 110. According to the illustrated embodiment, the dolly 100 has a release mechanism 121 which is mounted to the frame 110 and connected to the tow bar 112 and, optionally, to the handle 113. The tow bar 112 acts as a primary input device for the release mechanism 121, whereas the handle 113 is an optional secondary input device.

According to the illustrated embodiment the release mechanism 121 acts on two different wheels 111. The release mechanism 121 is therefore divided into two branches 127, 128, namely a first branch 127 located on the right and a second branch 128 the left side of the frame 110. Each branch 127, 128 connects to a wheel 111.

Figure 2:
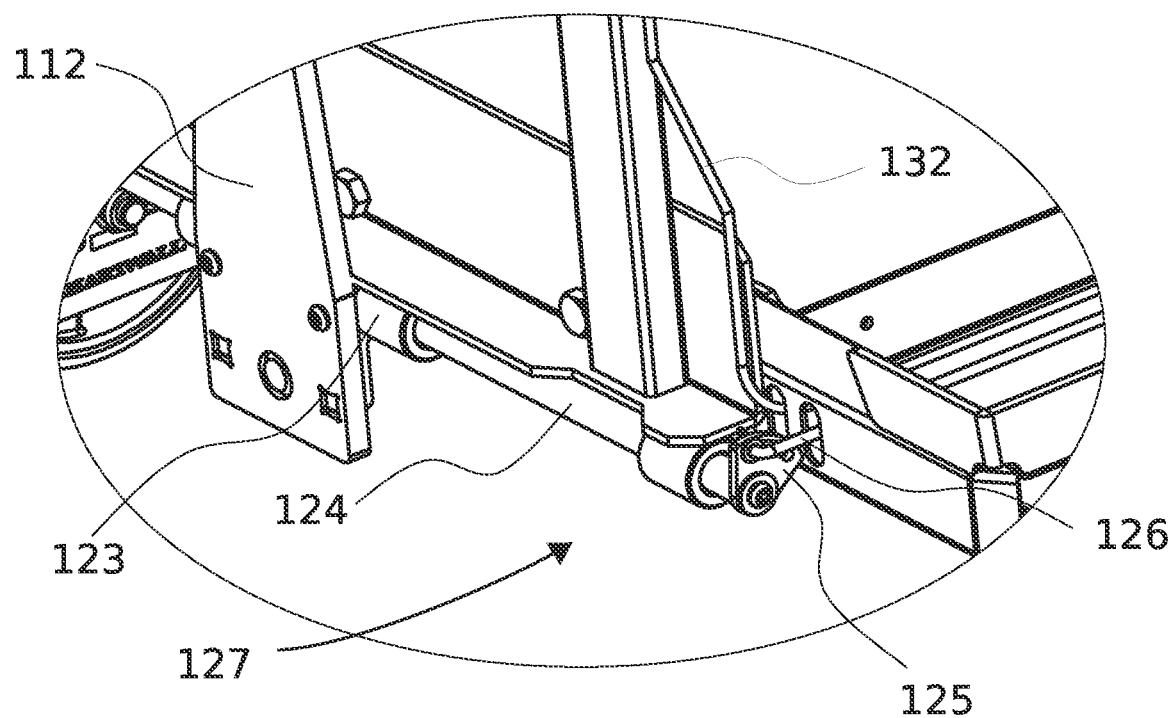
FIG. 2 illustrates a detail view of area A of FIG. 1.

FIG. 2 illustrates detail view A of FIG. 1. According to the illustrated embodiment, the tow bar 112 is connected to a biasing mechanism 123. The tow bar 112 is connected to an axle 124 which shares an axis of rotation with the tow bar 112. A biasing mechanism 123 is connected to tow bar 112 and axle 124 to apply force on the tow bar 112 to rotate the tow bar 112 towards the vertical orientation. The axle 124 has a first end connected to the first branch 127 and a second end connected to the second branch 128. The first end of the axle 124 is opposite of the second end of the axle 124.

A motion converter 125 is connected to the end of the axle 124, where the motion converter 125 is able to rotate at the same angular velocity as the axle 124. A second end of a transmission line 126 for the tow bar is connected to the motion converter 125, where the transmission line 126 is able to translate linearly.

Figure 3:
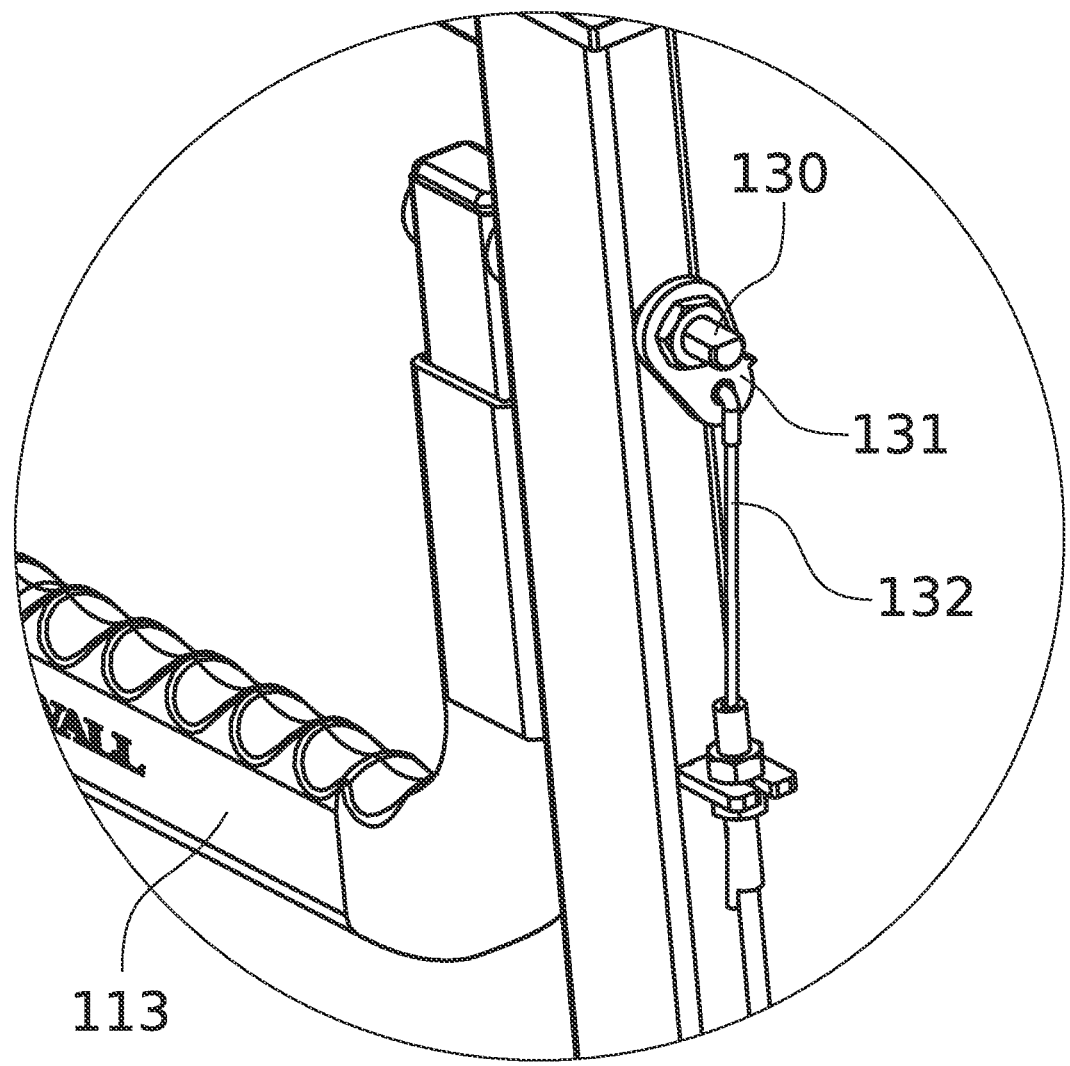
FIG. 3 illustrates a detail view of area B of FIG. 1.

FIG. 3 illustrates detail view B of FIG. 1. According to the illustrated embodiment, a handle 113 is connected to a first end of a handle axle 130, where the handle 113 and handle axle 130 share an axis of rotation. A motion converter 131 is attached to a second end of the handle axle 130, which transmits rotation of the handle 113 to the motion converter 131. A second end of a transmission line 132 for the handle 113 is connected to the motion converter 131.

Figure 4:
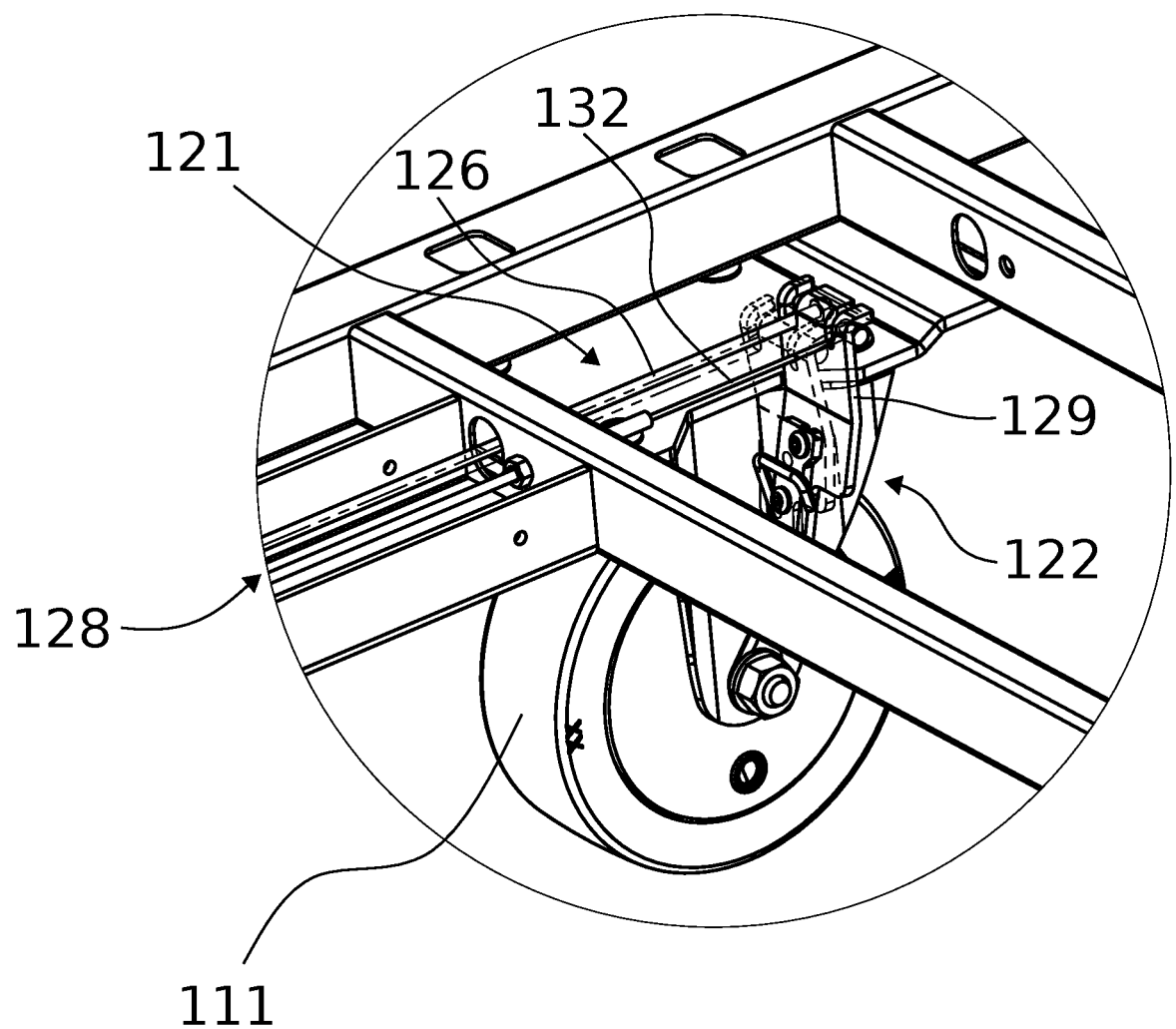
FIG. 4 illustrates a detail view of area C in an engaged state.

FIG. 4 illustrates detail view C of FIG. 1. According to the exemplary embodiment, the release mechanism 121 is divided into two branches 127, 128, each branch comprising a transmission line running from the input device, i.e. tow bar or handle, to an auto-engaging brake 122. FIG. 4 illustrates the branch 128 mounted on the left side of the frame 110. A first end of the transmission lines 126, 132 are connected to an impactor 129. The auto-engaging brake 122 comprises the impactor 129, in which the auto-engaging brake 122 comes in contact and releases contact with the wheel 111. FIG. 4 reveals the impactor 129 in the applied state illustrated in solid lines, and reveals the impactor 129 in the released state illustrated in dashed lines. According to the illustrated embodiment the impactor 129 is constructed as a rotatable lever which includes a mounting point for the transmission lines 126, 132. As illustrated, the transmission line 126, 132 may take the form of a cable. Accordingly, the brake end of the cable may be affixed to the free end of the brake lever.

According to one embodiment, the auto-engaging brake 122 is integrated into the wheel 111. Such brake mechanisms are commercially available and known per se. One commercially available option is the "Dead man's brake" castor by Blickle. Such auto-engaging brakes are concealed under a cover of the brake so as to keep the brake mechanism protected from the elements. Such auto-engaging brakes are known to default into a braking state with aid of biasing devices incorporated into the mechanism. Accordingly, the brake must be separately released with aid of a brake lever, such as the illustrated impactor, for example.

The following paragraphs describe the usage of components of the dolly 100.

When the first hitch counterpart 133 and the second hitch counterpart 134 of another dolly are connected, the counterparts are configured to allow for rotation between the tow bar 112 of one such dolly and the frame 110 of another such dolly about a vertical rotation axis. The first hitch counterpart 133 and the second hitch counterpart 134 of another dolly are connected when the tow bar 112 is in a horizontal orientation, which is a towing orientation. According to the exemplary embodiment, the tow bar 112 is configured to move from the storage orientation to the towing orientation. This process may be done by the user unhitching the hitch counterparts 133, 134.

The release mechanism 121 can selectively manipulate the auto-engaging brake 122 to toggle between an applied state and a released state. When the tow bar 112 is in the towing orientation (see dashed lines in FIG. 1), the release mechanism 121 manipulates the auto-engaging brake 122 into the released state, i.e. the auto-engaging brake 122 does not prevent the wheel 111 from turning. When the tow bar 112 is in the storage orientation (see solid lines in FIG. 1), the release mechanism 121 manipulates the auto-engaging brake 122 into the applied state, i.e. the auto-engaging brake 122 prevents the wheel 111 from turning.

The biasing mechanism 123 seen in FIG. 2 applies force on the tow bar 112 to automatically rotate the tow bar 112 from the towing orientation to the storage orientation when the first hitch counterpart 133 is no longer engaged to the second counterpart 134 of such dolly in series, i.e. when the first and second counterparts 133, 134 are unhitched. The function of the biasing mechanism is to automatically manipulate the auto-engaging brake 121 into the applied state immediately after a user disconnects the first and second counterparts 133, 134. This is convenient since the user does not take an extra step to apply the auto-engaging brakes 121 to the wheels 111.

The motion converter 125 transmits rotational movement of the axle 124 to translation of the transmission line 126. In other words, when the tow bar 112 rotates from storage orientation to towing orientation and from towing to storage orientation, the axle 124 and motion converter 125 rotate, which causes the transmission line 126 to translate in a linear direction. The transmission line 126 then manipulates the impactor 129 to be in the applied state or the released state.

The motion converter 131 seen in FIG. 3 is configured to transmit rotational movement of the handle axel 130 to translation of a transmission line 132. In other words, when the handle 113 is rotated, the transmission line 132 manipulates the impactor 129 and toggles the auto-engaging brake 121 between the applied and the released state.

FIG. 4 illustrates the branch 128 comprising of transmission lines 126, 127. The impactor 129 causes the auto-engaging brake 122 to impact or not impact the wheel 111. When the impactor 129 and auto-engaging brake 122 are in the applied state, the auto-engaging brake 122 is applied to the wheel 111, i.e. the brake pad (not shown) auto-engaging brake 122 comes into contact with the wheel 111. The applied state is configured to prevent the wheel 111 from rotating, and therefore, prevent the dolly 100 from moving while in storage. The applied state of the impactor 129 is illustrated in solid lines in FIG. 4. When the impactor 129 and the auto-engaging brake 122 are in the released state, the auto-engaging brake 122 is released. The released state is configured to allow the wheel 111 to rotate, and therefore, allow the dolly 100 to move while being towed. The released state of the impactor 129 is illustrated in dashed lines in FIG. 4. According to the illustrated embodiment, the impactor 129 turns between two positions which correspond to the released and applied states.

To summarize the usage, the end result of moving the tow bar 112 into either the storage or the towing orientation is to apply the auto-engaging brake 122 onto the wheel 111 or release the auto-engaging brake 122 from the wheel 111.

A person skilled in the art may foresee several variants of the above described embodiment. For example, another embodiment comprises the frame 110, which may be configured to support a platform on top of itself. The frame 110 may be made of aluminum and may be assembled by fasteners. The frame 110 may have one wheel or a plurality of wheels. The frame 110 may have all fixed wheels, all swiveling wheels, or a combination of both types. The auto-engaging brake may be attached to swiveling and non-swiveling wheels. The frame 110 may exclude an upper section. The frame 110 may have two sides or more than two sides. The tow bar 112 may be connected to the frame 110 at the right side, the left side, the front side, the back side, a top side or a bottom side.

According to another embodiment, the release mechanism 121 may be mounted only on one section or sides of the frame 110 or on many sections or sides of the frame 110. The release mechanism 121 may be connected to only the tow bar 112, may be connected to the tow bar 112 and the handle 113, or may be connected to many components of the dolly 100.

According to another embodiment, the dolly 100 has a first and a second hitch counterparts 133, 134, wherein the first hitch counterpart 133 may be a female or a male connection and the second hitch counterpart 134 may be a female or a male connection. The female connection may be a hole and the male connection may be a common male hitch connection as known in the art.

According to another embodiment, the tow bar 112 may be moved from the vertical storage orientation to the horizontal orientation by hand of the user, or some manual action by the user. Alternatively, the tow bar 112 may be moved from the vertical storage orientation to the horizontal orientation by automation. According to another embodiment the storage orientation, where the auto-engaging brake 122 is in the applied state, may be at an angle to a vertical plane, i.e. the storage orientation may be slightly non-vertical. According to another embodiment the towing orientation, where the auto-engaging brake 122 is in the released state, may be at an angle to a horizontal plane, i.e. the towing orientation may be slightly non-horizontal.

The biasing mechanism guides the tow bar 112 from the horizontal towing orientation to the vertical storage orientation soon after the tow bar 112 is disconnected from another dolly, specifically, when the first hitch counterpart 133 detaches from the second hitch counterpart 134 of another dolly. According to an embodiment, the biasing mechanism may be a spring or a type of damper, such as a spring, pneumatic or hydraulic damper.

According to another embodiment, the dolly 100 may comprise more than two branches. Additionally, the branch may have more than one wheel. Each branch may comprise only one transmission line or may comprise a plurality of transmission lines. The release mechanism may combine a plurality of transmission lines into one transmission line. Each branch may comprise one impactor or may comprise a plurality of impactors. Each branch may comprise of one auto-engaging brake or a plurality of auto-engaging brakes, wherein the auto-engaging brake is applied to at least one wheel.

According to another embodiment, the transmission line 126 may be connected directly to the tow bar 112 or axle, where the tow bar 112 or axle may directly cause the transmission line 126 to translate.

Additionally or alternatively, the transmission line 132 may be connected directly to the handle 113 or handle axle 130, wherein the handle 113 or handle axle 130 may directly cause the transmission line 132 to translate. The transmission lines 126, 132 may be directly connected to the auto-engaging brake 122. The motion converter 125, 131 may be a cam-shaped object which connects the axle 124 or handle axle 130 through the object's center and has an offset surface in order transfer the rotational movement of the axle 124 or handle axle 130 into translation. The motion converter 125, 131 may be additional cable or winding length which is wound on the axle 124 or handle axle 130 and is able to wind and unwind to translate the transmission line. The motion converter 125 may be connected to the first end, second end, middle, or a position in between the middle and either end of the axle 124. The motion converter 125 may rotate at the same or different angular velocity as the axle 124. The axle 124 may rotate at the same or different angular velocity as the tow bar 112.

According to another embodiment, the transmission lines 126, 132 may be a cable, chain, rod, belt, electric command line to an actuator at the impactor, or a shaft.

According to another embodiment, the handle may manipulate the transmission line to translate by means of rotating the handle, squeezing the handle, pressing a button, or translating the handle to a different position, such as vertical translation.

According to another embodiment, the impactor 129 and the auto-engaging brake 122 may be in the applied and the released states by electric command, and therefore the impactor 129 and the auto-engaging brake 122 may be stationary while transitioning between the applied and the released states.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Feature |
|---|---|
| 100 | dolly |
| 110 | frame |
| 111 | wheel |
| 112 | tow bar |
| 113 | handle |
| 121 | release mechanism |
| 122 | auto-engaging brake |
| 123 | biasing mechanism |
| 124 | axle |
| 125 | motion converter |
| 126 | transmission line for tow bar |
| 127 | first branch |
| 128 | second branch |
| 129 | impactor |
| 130 | handle axle |
| 131 | motion converter |
| 132 | transmission line for handle |
| 133 | first hitch counterpart |
| 134 | second hitch counterpart |

The invention claimed is:

1. A dolly comprising:
at least one wheel,
an auto-engaging brake configured to:
   brake the at least one wheel in an applied state of the auto-engaging brake and to
   not brake the at least one wheel in a released state of the auto-engaging brake, and
a release mechanism configured to selectively manipulate the auto-engaging brake to the released state,
further comprising a tow bar connected to the release mechanism for operating the auto-engaging brake between the applied and released state; wherein
the dolly further comprises a handle which is connected to the release mechanism, and to be toggled between:
   an inactive state, in which the handle does not impact the release mechanism, and
   an active state, in which the handle impacts the release mechanism so as to manipulate the auto-engaging brake to the released state.

2. The dolly according to claim 1, wherein the tow bar is pivotably provided to the dolly to be turned between a generally vertical storage orientation and a generally horizontal towing orientation.

3. The dolly according to claim 2, wherein the auto-engaging brake alternates between a braking state and the released state, and is configured to default into the braking state.

4. The dolly according to claim 2, wherein the tow bar alternates between a towing orientation and a storage orientation, and is connected to the release mechanism such that the release mechanism manipulates the auto-engaging brake to the released state, when the tow bar is in the towing orientation.

5. The dolly according to claim 2, wherein the tow bar alternates between a towing orientation and a storage orientation, and is connected to the release mechanism such that the release mechanism allows the auto-engaging brake to return to the applied state, when the tow bar is in the storage orientation.

6. The dolly according to claim 1, wherein the auto-engaging brake alternates between a braking state and the released state, and is configured to default into the braking state.

7. The dolly according to claim 6, wherein the tow bar alternates between a towing orientation and a storage orientation, and is connected to the release mechanism such that the release mechanism manipulates the auto-engaging brake to the released state, when the tow bar is in the towing orientation.

8. The dolly according to claim 6, wherein the tow bar alternates between a towing orientation and a storage orientation, and is connected to the release mechanism such that the release mechanism allows the auto-engaging brake to return to the applied state, when the tow bar is in the storage orientation.

9. The dolly according to claim 1, wherein the auto-engaging brake comprises an external impactor which is configured to selectively operate the brake between the applied and released state upon manipulation of the impactor.

10. The dolly according to claim 9, wherein the release mechanism comprises a transmission line connecting the tow bar to the impactor and configured to transmit and convert rotation movement of the tow bar into manipulation of the impactor.

11. The dolly according to claim 9, wherein the tow bar is connected to the dolly through an axle which is configured to transmit rotational movement of the axle as translation of the transmission line.

12. The dolly according to claim 1, wherein:
the dolly further comprises a frame,
the tow bar comprises a first hitch counterpart,
the dolly further comprises a second hitch counterpart provided at an end of the frame opposing the tow bar, and wherein
the counterparts are configured to selectively engage each other for connecting several such dollies in series.

13. The dolly according to claim 12, wherein the counterparts are configured to allow for rotation between the tow bar of one such dolly and the frame of another such dolly about a vertical rotation axis.

14. The dolly according to claim 12, wherein the first counterpart is female, the second counterpart is male.

15. The dolly according to claim 1, wherein the tow bar alternates between a towing orientation and a storage orientation, and is connected to the release mechanism such that the release mechanism allows the auto-engaging brake to return to the applied state, when the tow bar is in the storage orientation.

16. The dolly according to claim 15, wherein the dolly further comprises biasing means configured to urge the tow bar towards the storage orientation.

17. The dolly according to claim 1, wherein the tow bar alternates between a towing orientation and a released orientation, and is connected to the release mechanism such that the release mechanism manipulates the auto-engaging brake to the released state, when the tow bar is in the towing orientation.

18. The dolly according to claim 1, wherein:
the dolly further comprises a plurality of wheels and a plurality of auto-engaging brakes associated with the plurality of wheels, and wherein
the release mechanism comprises a respective plurality of branches for the wheels' auto-engaging brakes.

19. The dolly according to claim 1, wherein the release mechanism comprises a second transmission line connecting the handle to the impactor.

* * * * *